March 8, 1949.　　　　　R. E. NEWELL　　　　　2,463,712
METHOD OF OVEN HEATING AND CONTROL
Filed March 21, 1945　　　　　　　　　　　　　3 Sheets-Sheet 1
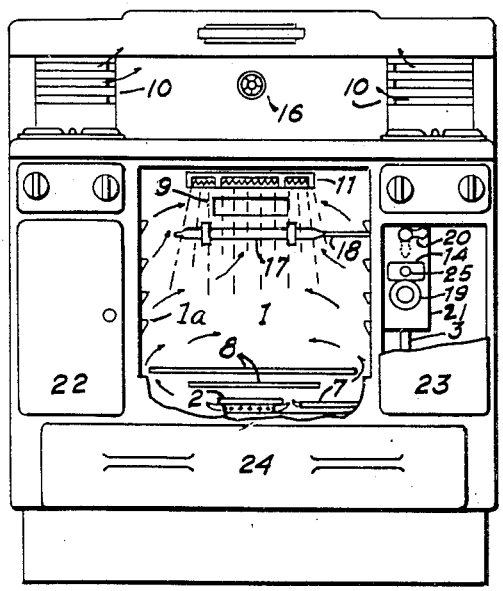
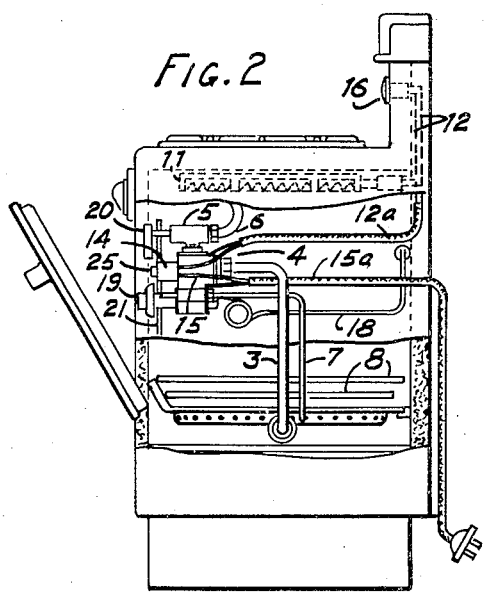
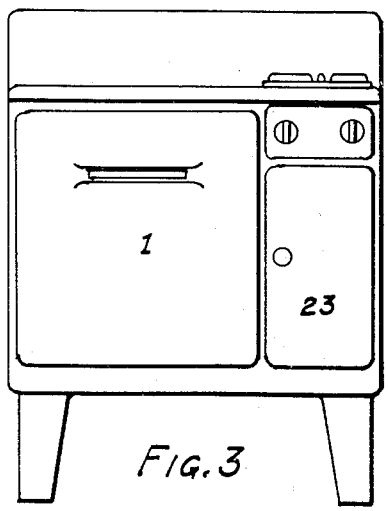
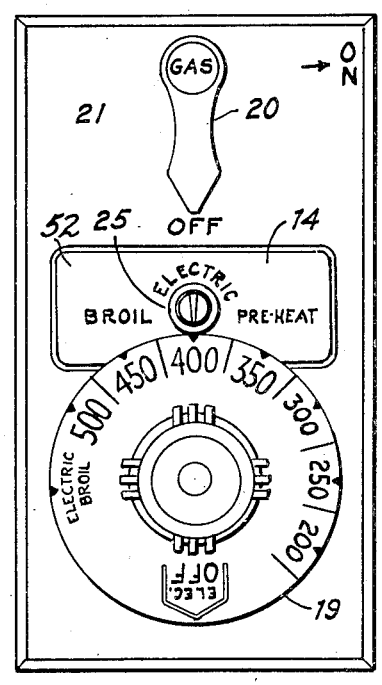
INVENTOR
Robert E. Newell
BY
ATTORNEY March 8, 1949. R. E. NEWELL 2,463,712
METHOD OF OVEN HEATING AND CONTROL
Filed March 21, 1945 3 Sheets-Sheet 2

INVENTOR
Robert E. Newell
BY
ATTORNEY

March 8, 1949.  R. E. NEWELL  2,463,712
METHOD OF OVEN HEATING AND CONTROL
Filed March 21, 1945  3 Sheets-Sheet 3
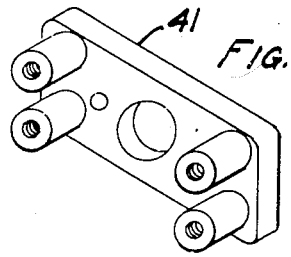
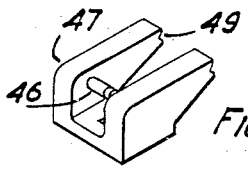
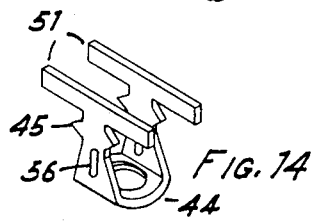
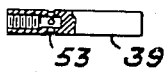
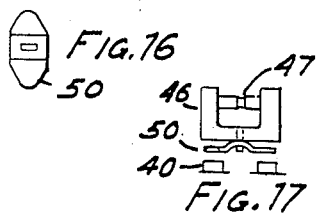
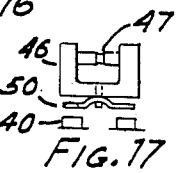
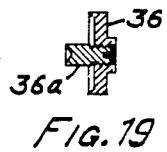
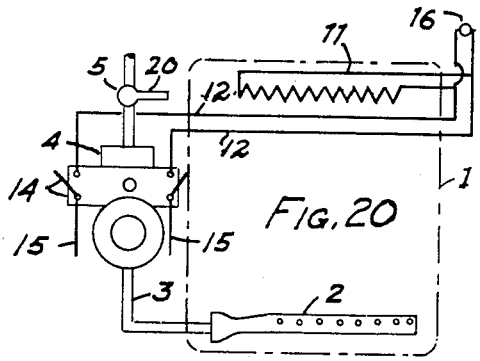
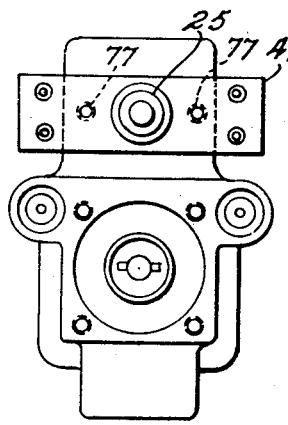
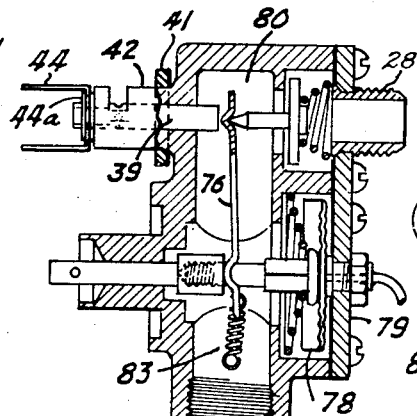
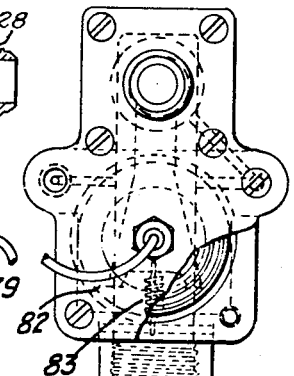
INVENTOR
Robert E. Newell
BY
ATTORNEY Patented Mar. 8, 1949

2,463,712

UNITED STATES PATENT OFFICE 2,463,712

METHOD OF OVEN HEATING AND CONTROL

Robert E. Newell, Irwin, Pa.

Application March 21, 1945, Serial No. 583,917

4 Claims. (Cl. 200—53)

This invention relates essentially to domestic gas ranges, particularly to the manner of heating, and the thermostatic control of oven temperatures, by simultaneous regulation of a gas burner and an electric unit.

In the evolution of the modern gas range, especially during the past twelve years, two problems of importance have presented themselves.

One of these has been that of obtaining lower operating temperatures on heavily insulated ranges, while at the same time retaining a rapid heating speed. The other has been a problem connected with broiling.

An improved thermostatic control, designed for low-temperature regulation of insulated ovens, has been described by me in my pending application Serial No. 556,227, filed September 28, 1944 and subsequently abandoned. In that application the entire problem of low temperature is fully discussed. The control therein described has proven in use to be practical.

The purpose of the present invention is to proceed a step farther, by incorporating new features with said control, in combination with a new method of heating, thereby making possible the building of heavily insulated ovens easily controlled at low temperatures, and also having nearly twice the maximum heating speed formerly possible, as well as providing a practical solution of the broiler problem above mentioned.

This broiler problem, in a gas range, is primarily a matter of space and cost, and secondly a question of speed and efficiency. In order that this may be clearly understood, and the need for the present invention properly comprehended, I shall explain it in more or less detail.

Formerly, separate gas broiler burners were provided in a compartment high above the cooking top of the range. Later they were placed beside the oven, below the cooking top. These separate broiler compartments cost as much to build as the oven itself. If automatic ignition was provided, two sets of pilots, safety cut-off valves, and in the case of electric ignition, two separate igniters, were required, one for the oven and one for the broiler.

A less expensive method has been to provide a broiler compartment below the oven, using the oven burner also as a broiler burner.

However, with the advent of console or "table top" range designs, this meant that the broiler compartment had to be placed near the floor level, where it has been very inconvenient to use, and in fact is very little used by housewives, largely on that account. Therefore the objection to this arrangement has been general, and persistent.

To further complicate the matter for the range manufacturer, certain designs have been popularized, such as the "divided top," for instance, in which there is not sufficient room for placing the broiler compartment in any location except below the oven. In the "divided top" design the oven is placed in the middle of the range, with two top burners on each side, below which are narrow utility compartments. There is not room enough on either side of the oven to place a separate broiler compartment.

So much for the matter of space and cost.

The question of speed and efficiency in broiling must include difficulties which arise from the very nature of the method of transmitting heat for broiling.

In baking or roasting in the oven, the food is above the burner, and is heated mainly by convection of the heated products of combustion, which normally travel upward and around the food being cooked. Gas is ideal for this purpose, as it is economical, heats the oven rapidly, is easily and accurately controlled, so as to maintain a perfectly uniform temperature. Because of this sensitive control, and rapid heating characteristic, any temporary drop in oven temperature due to opening the oven door for inspection of food, etc., is recovered with twice the speed of an electrically heated oven.

However, in broiling, an entirely different picture presents itself. The food to be broiled is placed below instead of above the burner. Therefore it cannot be heated by convection, but must be cooked by radiated heat.

As is well known, the percentage of heat radiated by a gas flame, especially a Bunsen flame, is very small. Consequently before broiling can be done the oven door is propped open about an inch and the entire broiler and oven above it must be heated for ten to fifteen minutes at full capacity, raising the temperature of broiler compartment and oven to a point at which the burner is almost red hot, and the oven bottom and side walls of the broiler compartment are hot enough to radiate sufficient heat for broiling.

It therefore requires as much time and fuel to "pre-heat" the oven, before broiling can be started, than is usually required for the actual broiling. This of course heats the kitchen or room where the range is located, and is particularly objectionable in summer time, or in sections of the country where mild weather prevails.

An electrical heating unit, on the other hand, while not generally as economical as gas or as adaptable for close temperature control, or quick recovery of oven temperatures in baking, is undoubtedly more suitable for broiling.

The reason for this is that an electrical unit operates entirely by radiated heat rather than by convected heat. This radiated heat may of course be directed downward as easily as the convected heat of a gas burner may be directed upward. All of the radiated heat of an electrical unit acts instantly and directly upon the food placed below it, without heating the air intervening, or the sidewalls of the broiler compartment. Its maximum effective heat is reached in thirty seconds, therefore, no preheating is necessary before broiling is started.

To make a specific comparison:

An electrical broiler unit having a rating of 1500 watt, at 110 volts, or 13.6 amperes, has a heat "input" equivalent to only 5000 B. t. u.

A gas burner of the usual size required for domestic ovens has a B. t. u. rating of approximately 22,000, or forty-four cubic feet per hour, of manufactured gas.

To broil a steak, for instance, of a given size with the electrical unit above described will require a total time of fifteen minutes.

To broil a steak of the same size, to the same degree, with the gas burner mentioned, will require twenty-four minutes, including pre-heat time.

The relative efficiency therefore is $$\frac{24 \times 22000}{15 \times 5000} = 7.01$$

That is, the electrical unit, for broiling, is seven times as efficient as the gas burner.

I am aware that in the keen competition for sale of gas and electricity, and their appliances, some fanciful claims and doubtful criticism is indulged in. It is not the purpose, however, of the applicant, in this description to make any prejudiced or controversial statements as to the relative advantages, in general, of gas and electricity, for cooking purposes, since the invention about to be described combines in the oven the use of both sources of energy for the purpose to which each is best adapted, and in a manner providing improved results which could not be obtained by the use of either without the other.

Specifically, the invention includes an oven provided with a standard type gas burner at the bottom, for the usual baking and roasting purposes, and an electric heating unit at the top of the oven for broiling purposes, and for use in combination with the aforesaid gas burner during preheating of the oven for baking, the operation of both the electrical unit and the gas burner being controlled by a single thermostat responsive to the combined effect of each, or to the effect of the gas burner alone.

It may be mentioned here that it has been previously proposed to place a gas burner at the top of the oven for broiling purposes. While this would be a convenience for broiling, and result in a saving of space and expense over the building of a separate broiler compartment, it has the same inherent disadvantage, in low efficiency, characteristic of the use of a gas burner for broiling in any location, would require separate means of ignition, and could not be used simultaneously with the oven burner for preheating, as the products of combustion from the oven burner below would extinguish or smother the flame of the broiler burner above.

It has also been proposed, as described in the patent to L. S. Madlem, No. 2,282,489, that a small electrical unit be placed in the lower part of the oven, adjacent a gas burner, with a time operated cut-off valve adapted to cut off the gas supply to the gas burner at the end of a timed preheating period, and cut in the electrical unit, which thereafter, during the baking period, is controlled by a thermostat responsive to oven temperatures.

The alleged advantage of such a device is that of economy of operation. As already stated there is no economy whatever in the operation of an electrical unit as compared to gas, for baking purposes.

No economy is claimed, except in the matter of time, in the use, in the present invention, of both gas and electricity in preheating the oven. However, this advantage of greater speed could not be obtained in any other way. It could not be obtained, for instance by using a larger gas burner, for two reasons.

First, because the size of the oven and its flueways, limit the size of burner that can be used without generating CO and interfering with proper combustion. Second, if a larger burner were used, that is large enough to provide additional heat equal to the heating effect of the electrical unit at the top of the oven, it would be impossible to reduce the amount of by-passed gas for a low flame, on a standard thermostat, to a point low enough to control ordinary baking temperatures below 400 degrees, in an insulated range.

It may occur to some that the products of combustion would quickly corrode the resistor of an electric unit placed at the top of a gas oven, and that indeed they might tend to smother or reduce the efficiency of such a unit.

These resistors are made of chromium-nickel alloy, highly resistant to such products of combustion, and of course since no combustion takes place in the use of purely radiant heating, its efficiency is not impaired by a lack of surrounding oxygen, as evidenced by the ordinary electric light, which is filled with an inert gas.

It may also be thought that an electrical resistance, operating above a gas burner, would create a fire hazard, in that unburned gases escaping from the gas burner might thereby be ignited.

This cannot occur as the temperature of the electrical resistance, when heated to a cherry red, is only about 1400 degrees F. To ignite gas, in an open chamber, a resistance temperature of 2000 to 2500 degrees is required.

In tests, a stream of gas from a hose was played directly upon the resistance element herein described, at its maximum heat, without igniting the gas.

However, as an additional safety precaution, a safety shut off valve, of any commercial type, may, if desired, be installed, to prevent escape of unburned gas in event the pilot becomes extinguished.

In this invention a new principle is recognized and taken advantage of in the simultaneous use of a radiant unit within a gas oven, for both broiling and preheating. In preheating it injects additional heat into the oven, above the maximum possible by the use of gas alone, thereby super-heating the oven to a higher temperature in a given time than could otherwise be done, without adding to the volume of the products of combustion in the oven, or otherwise affecting its efficiency. In actual practice, a speed in heating is obtained forty per cent faster than that of any gas or electric range ovens now on the market, of which I have knowledge.

By means of the special control about to be described, all the advantages in broiling of a standard electric range is obtainable, without the need of special transformers or heavy duty wiring, as the electrical unit used is only of 1200 to 1500 watt capacity, and may be connected to the ordinary 110–120 volt house circuit.

A further advantage of the new system of oven heating and control is as follows:

With the low temperature control described in my prior application No. 556,227, it is possible to control oven temperatures, using a full sized standard burner, at all points down to approximately 100° F.

However, with the aid of an electrical unit as above described, for preheating, it is possible to attain the same heating speed by the use of a gas burner 40% smaller in size and capacity.

With such a smaller burner the minimum bypass flame may be regulated low enough so that the oven will not exceed 200° to 210° F., whereas, on the same oven, with a standard gas burner, the temperature could not be maintained lower than 320°. These figures are based on burners using natural gas, in both cases.

With this arrangement the auxiliary snap action control valve and the mechanism which operates it, as described in the aforesaid prior application, may be eliminated, so that the thermostat will operate the gas burner exactly as a standard type control, except that temperatures may be controlled down to approximately 200° F. With such an arrangement the advantage of greater heating speed is of course sacrificed, as is also the feature of being able to regulate the temperature at, say 150°, as for a warming oven.

However, its lower cost and simplicity make it desirable, especially from the range manufacturers' view point, for small low priced ranges.

While the above apparently simple facts, and the advantages accruing therefrom may, since they have been presented, appear obvious, they have not, to my knowledge been heretofore pointed out.

Referring to the drawings:

Fig. 1 is a front view of a modern gas range of "divided top" design, with the new method of heating and control. Cut away sections show the electric heating unit, the gas burner and the control panel.

Fig. 2 is an end view of the range shown in Fig. 1. Part of the end outer wall is cut away, also part of the side wall of the oven, showing the burner and an outline of the control and its connections.

Fig. 3 is an outline front view of a small, low-cost design of range, made possible by the new method of heating and control, and which is especially adapted to use in small apartment kitchenettes and summer cottages.

Fig. 4 is an enlarged front view of the control panel.

Fig. 11 is a perspective view of the switch base plate.

Fig. 12 illustrates the stationary contact and lead assembly.

Fig. 13 is a perspective view of the movable contact arm.

Fig. 14 is a perspective view of a switch support bracket.

Fig. 15 is a view, partly in section of the switch gland pin.

Fig. 16 is a detail view of a movable contact.

Fig. 17 illustrates the manner of assembly of the movable contact with the movable contact arm.

Fig. 18 is a perspective view of the push button.

Fig. 19 shows the assembly of the main gas valve with an adjustable stem.

Fig. 20 is a diagram of the wiring, valve and burner arrangement shown in Figures 1 and 2.

Figure 5:
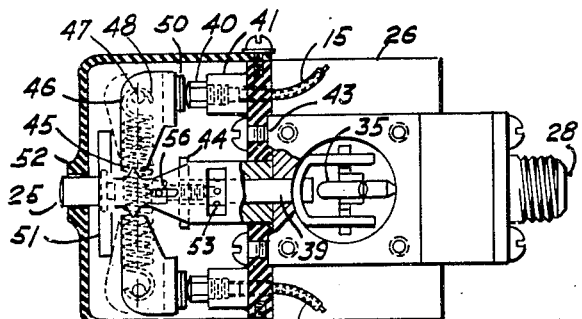
Fig. 5 is a top view of the control and switch.

Figures 21, 22, and 23 are front, side section, and side external views, respectively, of another and simplified form of control which may be used in conjunction with the switch, instead of that shown in Figures 5 to 10.

In Fig. 1 the oven is represented by numeral 1. Projections 1a in the side walls midway between the top and bottom of the oven, support food racks or trays. The oven burner 2 is supplied with gas through tubing 3, which is connected to the control 4, as indicated in Fig. 2. An independent standard gas cock 5 is inserted at the top of the control 4, receiving gas through tube 6, which is connected at its opposite end to a concealed gas manifold under the cooking top of the range.

7 is an igniter pilot tube, also connected to the control 4.

Baffle plates 8 block off direct radiation from the burner into the oven and divert the heated gases to side openings as indicated by the arrows Fig. 1, from which openings the heat is distributed evenly throughout the oven, the heated products of combustion finally passing out the opening 9, through concealed flueways to external flue outlets 10, on the back panel of the range.

11 is the electric heating unit, at the top of the oven. This should have a rating of about 1500 watts at 110 volts. It is wired at the rear to leads 12, indicated in dotted lines in Fig. 2, carried in sheath 12a to the outlet side of an automatic circuit breaker switch 14, which is a part of the control 4, and later described in detail. Wires lead from the opposite side of this switch through the sheath 15a to a source of current, preferably a base plug, connected to the regular house lighting circuit.

A signal light 16, Figs. 1 and 2, is connected in parallel with the heating unit 11, to indicate when the unit is operating, and when the oven has reached the desired temperature, as will be later explained.

17 is a thermally sensitive bulb, which connects by a capillary tube 18 to the control 4, operating a bellows element therein, as will be later set forth. A control dial 19, and gas cock handle 20 extend from the control and gas cock through a panel 21.

Doors 22 and 23 provide access to utility compartments at each side of the oven, and to the control panel 21. Due to the elimination of the usual broiler compartment below the oven it is now possible to provide a large additional utility drawer 24, Fig. 1, convenient for storing broiler and biscuit trays, waffle irons, skillets and other items which could not be conveniently placed in the narrow side compartments 22 and 23.

In low priced models of ranges where cost is a primary factor, the space formerly occupied by the broiler compartment may be replaced merely by legs, as indicated in the small design shown in Fig. 3, in which the signal light is also eliminated. This provides a very acceptable model for small apartment kitchenettes, summer cottages, and general light housekeeping.

Referring to Fig. 4, which is an enlarged front view of the control panel 21, a rectangular Bakelite cover 52 for the switch portion of the control extends through the panel 21 and carries a push button 25, by which the switch is set manually to closed position, in a manner to be later described.

A vertical line extending across the diameter of this push button also serves as a reference mark to which indicia on the dial is set.

The dial 19 carries the usual temperature markings for baking, etc., the temperature markings up to 300, however, being of a different color or design, to designate "low" temperatures, (which could not be controlled on present type ranges) at which points the operation of the burner is slightly different, as will later be pointed out.

Modern insulated gas ranges which meet the speed and surface temperature requirements of the AGA testing laboratories, cannot be controlled thermostatically at any point below 320 degrees, that is, when equipped with "standard" type controls.

At a point on the dial 19, corresponding to a point of about 100 degree setting, a marking "Elec. off" signifies that when the dial is turned counterclockwise until this point is at the push button 25 the switch 14 will be open, regardless of the oven temperature.

Just above its 500 degree point the dial carries a marking "Electric broil," at which setting the push button 25 may be pushed in to close the switch 14. When so closed the switch will remain closed, for broiling, until the dial is turned back to "Elec. off."

The control 4 is so constructed that, if desired, the dial 19 may be made large enough to cover the push button 25, whereupon the push button is pressed in by pushing inward upon the dial 19.

Before entering into a detailed description of the gas control 4 and its switch I will now summarize briefly the procedure in operating the oven and its controls.

For broiling, with the electric unit, of course no gas is required, so the cock handle 20 is left at "off" position, as shown in Fig. 4, while the dial 19 is turned to "Electric broil," and the button 25 pushed in, which action, as above stated, closes the switch 14, connecting the circuit through the unit 11 and light 16, Figures 1 and 2. After broiling is completed the dial is turned to "Elec. off," causing cutting off of the current to the unit 11 and light 16, as hereafter explained.

For use of the oven at "low" temperatures, especially 250 degrees or lower, the electric unit need not be used for preheating, as by the use of gas alone the oven will reach these temperatures in three or four minutes. Therefore it will only be required to turn the gas cock to "on" position, light the oven pilot and set the dial 19 to the desired temperature.

The same procedure is followed for the higher temperatures, except that after setting the dial to the desired temperature the button 25 is pushed in to energize the electric unit.

In baking biscuits, for instance, it is required that the oven be preheated to 450 degrees, and that the biscuits be placed in the oven for a period of 13 minutes. By using gas only, it will require 10 minutes to preheat the oven. However, with the aid of the electric unit in addition to the gas, the oven will be preheated to 450 degrees in six minutes, whereupon the gas thermostat will automatically cut off the electric unit and continue to maintain the oven temperature with gas alone.

As previously explained, when the oven reaches the desired temperature the signal light 16 also cuts off, and as the switch 14 does not close again until manually reset, the signal light remains off, instead of coming on again at intervals, to confuse the operator, as it does in the usual electric range.

Should the light 16 fail to operate for any reason the push button 25 will itself provide a visible signal, as when the push button is in, the current is on, and when the switch operates to break the current it kicks the button 25 out nearly a quarter of an inch.

If desired, an audible signal may be provided in the form of a bell, sounded by the quick powerful action of the switch 14, when it opens.

Referring to Figures 5 to 10, which show the thermostat mechanism of the control, it will be seen that its general features resemble those shown and described in my application Serial No. 556,227, covering a low-temperature control for ovens, and also my application Serial No. 572,529, describing a two-stage water heater control.

Minor improvements have been added relative to the dial adjustment and calibration, but these features are not a part of the present invention.

Figure 7:
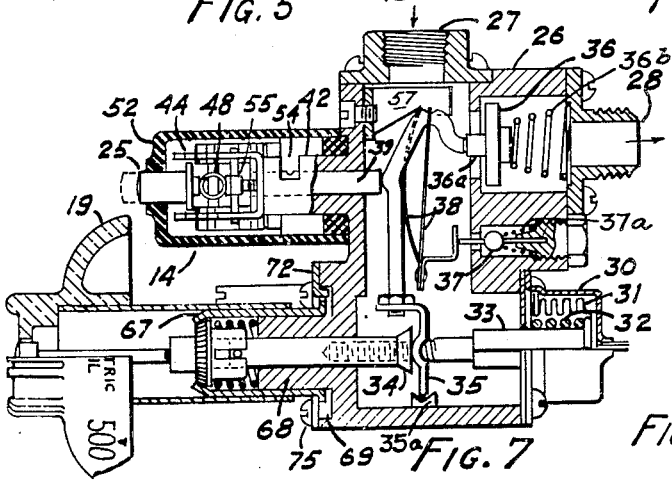
Fig. 7 is a vertical section through the center of the control and switch.

In Figure 7 the body or main housing 26 is provided with a gas inlet 27 in which, in the present application, the gas cock 5, Fig. 2 is to be inserted.

An outlet 28, is provided with a tubing connection to which, in the installation shown in Fig. 2, a tube 3 is connected, extending to the oven burner.

Figure 6:
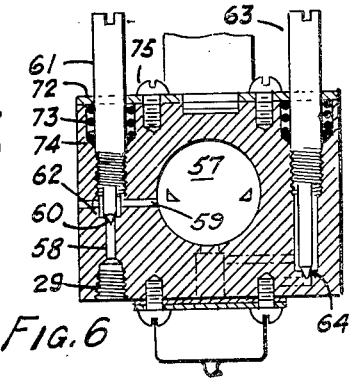
Fig. 6 is a section view of the control on the line A—A of Fig. 8.
Figure 8:
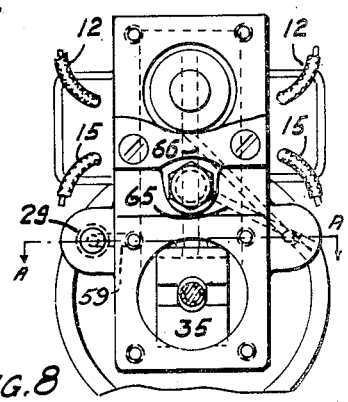
Fig. 8 is a rear view, with the bellows removed.

The lighter pilot tube 7, of Fig. 2, connects at the pilot connection 29, Figures 6 and 8.

Figures 9, 10:
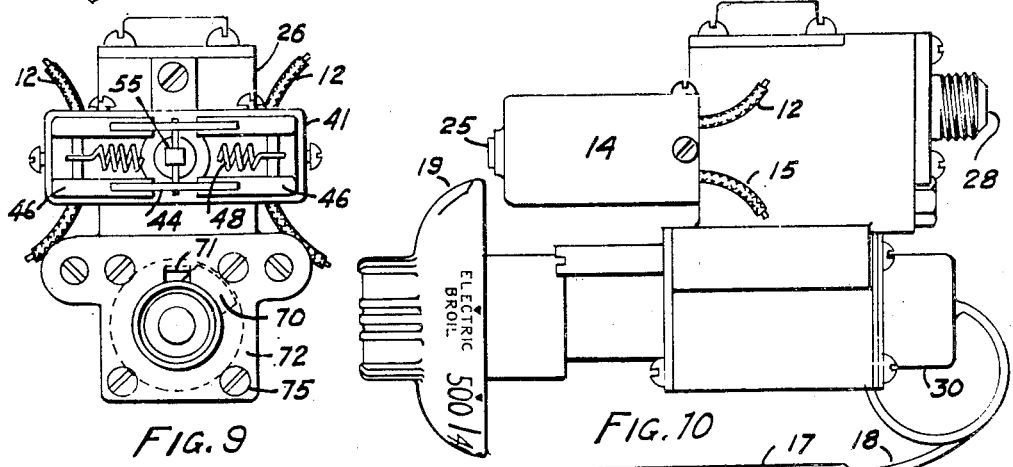
Fig. 9 is a front view, with the dial and switch cover removed.
Fig. 10 is a side external view of the control.

The bulb 17 and capillary tube 18, of Figures 1 and 2, connect to the bellows element 30 (Figure 10). As may be seen in Fig. 7, the bellows element 30 includes a bellows 31, a loading spring 32, and a post 33.

In threaded engagement with the post 33 is an adjusting stem 34, which is slidable endwise, and also rotatable in conjunction with the dial 19. The stem 34 is provided with an enlarged end portion, adapted to engage and operate lever 35 that is pivotally supported on a fulcrum 35a that is formed on the housing, in accordance either with the movement of the bellows, or the adjustment of the dial 19.

The lever 35 is movable on the stem 34 and has three functions. It operates the main gradual-acting valve 36, and a snap action by-pass valve 37, through snap leaf spring 38, as described in my application Serial No. 572,529. In the present invention it also operates the snap switch 14, through slidable gland pin 39.

The relative position of valve 36 to the lever 35 is adjustable by means of threaded valve stem 36a, as indicated in Fig. 19. The relative position of the mechanism of switch 14 to lever 35 is adjustable by means of a threaded arrangement at one end of gland pin 39, as shown in Fig. 5, and described later.

The valve 36 is adjusted on its stem 36a so that it closes just prior to the closing of valve 37, and the gland pin 39 is adjusted so that it starts to operate the switch 14 toward open position just prior to the closing of valve 36. The actual effect, however, is that the switch 14 and the valve 36 act together, that is the switch 14 opens with a snap action, and the valve 36 closes tight immediately thereafter.

This is caused by the resistance of the snap mechanism of the switch 14, just before it goes over center, which causes the closing of valve 36 to be delayed slightly. This is advantageous, in that it keeps the valve 36 open, so that a full, or nearly full, flow of gas is supplied to the burner up to the very point of maximum set temperature, thus increasing the heating speed of the gas burner, which would otherwise be gradually throttled and its heating speed slowed down. This is an objection to all gradual acting valves.

Once the snap mechanism of switch 14 goes over center, however, and the switch is open, the pressure through the gland pin 39 upon the lever 35 is released, and the valve 36 is operated in its normal function of maintaining a uniform temperature, independently of the switch.

The purpose of small valve 37, as described in my prior application Serial No. 556,227, is to regulate the by-pass gas and minimum flame of the burner with a snap action, to control low temperatures, that is up to 300°, in an insulated oven.

In Fig. 5, which is a plan view of the control projected from Fig. 7, a clear view is shown of the snap mechanism of switch 14.

While this snap mechanism may be made in various forms I prefer that shown because it is rugged and stable, and the entire design is as small as practicable for a two-pole single-throw switch, considering the large spacings required by the Underwriters Laboratories for insulation of 110 volt current.

Four stationary contacts 40, as shown in Fig. 12, are mounted in a moulded insulating base plate 41, illustrated in Fig. 11. Leads are soldered to the contacts, and when assembled in the base plate 41, two of these leads are connected to the source of current, and two leads to the load, in this case the electrical unit 11, Figs. 1 and 2. Each pair of leads is shown in Fig. 8, numbered 12 and 15, in accordance with the connection shown in Fig. 2, and diagram Fig. 20.

Referring again to Fig. 7, a boss 42 extends from the thermostat body 26 through a hole in base plate 41. The base plate 41 is secured to the body 26 by two screws 43 on each side of the boss 42. To the outer end of the boss 42 is secured a support bracket 44, shown in perspective in Fig. 14.

Pivoted upon the bearing points 45, on each side of this bracket are arms 46, made of moulded insulating material, and shown in perspective in Fig. 13. Cast into the outer end of each arm is a steel cross pin 47, having a groove at its middle to receive the hooked end of a strong tension spring 48. At the opposite end of the arms V grooves 49 are provided, to engage the bearing points 45 of the bracket 44.

When assembled, as shown in Fig. 5, the tension spring holds the arms 46 in firm contact with the bearing points 45, to one side or the other of the centerline of the spring, depending upon whether the switch is in open or closed position.

Secured at the outer end of each arm is a silver connector bar 50, shown in Fig. 16. This bar is pivoted at its center as indicated in Fig. 17, so as to make positive contact with stationary contacts 40. When such contact is made the circuit is closed on both sides of the line.

Referring to Fig. 5, the arms 46 are shown in the position occupied when the contacts are closed. The centerline of the tension spring 48 is slightly to the right of the points on which the arms are pivoted, thus holding the contacts in firm engagement.

A tension spring, even when extended, is quite flexible when pressed laterally at a point midway between its ends. Therefore should the spring 48 be pressed sidewise, to the left, for instance, until the center lines of each half intersect at a point beyond the pivoted bearing points of the arms, the outer ends of both arms would instantly snap to the position indicated by the dotted lines, thus opening the switch.

This is accomplished when the lever 35 moves to the left, Fig. 5, as the temperature of the oven increases. The lever presses the gland pin 39 to the left. On one end the gland pin carries an adjusting screw 55, better seen in Fig. 7, the head of which presses laterally against the spring 48, thus causing the switch to snap in the desired manner. The extensions 51, of the bracket 44 (Fig. 5) serve to limit the opening movement of the arms 46.

To close the switch, manually, the push button 25, previously mentioned, is pushed inward, through the cover 52, against the side of the spring until the arms 48 snap to closed position.

A detail view of the push button 25 is shown in Fig. 18. The large squared portion fits inside the bracket 44, as indicated in Fig. 7, preventing accidental rotation of the push button, and thus keeping the line across its outer end in vertical alignment, as shown in Fig. 4.

For adjusting the action of the switch mechanism relative to the position of the lever, the gland pin 39 is rotated by inserting a small pin in holes 53 provided near one end, as indicated in Figures 5 and 7 and 15. Access to these holes is made possible by a slot or rather groove 54 cut crosswise partially through boss 42.

As shown in Fig. 15, one end of the gland pin 39 is threaded, to receive a square headed screw, 55, shown in Fig. 7. This screw is prevented from rotating by a small cross pin through its head, as indicated in Fig. 7. The cross pin passes through a slot 56 on each side of the bracket 44 indicated in Fig. 5 and detail view Fig. 14.

Therefore, when the gland pin 39 is rotated, as above described, the overall length between the head of the screw, which contacts spring 48, and the opposite end of the gland pin, which contacts lever 35, is increased or diminished. The threaded connection between the screw and the gland pin is of course made a snug fit, to prevent accidental dislocation.

Figures 6 and 8 illustrate auxiliary gas supply lines from the main gas way 57, on the inlet side of the thermostat, to the igniter pilot, and around the valve 36, to supply a minimum by-pass gas to the main burner.

In Fig. 6, 29 is the connection for igniter tube 7, of Figures 1 and 2. Gas passes to the outlet 29 through hole 58 and cross hole 59, between which a needle valve 60, on the end of adjusting screw 61, provides means for adjusting the pilot gas supply. The valve 60 seats at 62.

The adjusting screw 63 provides means for adjusting the minimum by-pass gas to the main burner 2, by a second needle valve 64 at its end, regulating the gas passing from the main gas way, through snap valve 37 (Fig. 7), hole 65 (Fig. 8), and hole 66 (Fig. 8).

Stop means 70—71 for limiting the rotation of the dial between the "Elec. off" and "Electric broil" points, indicated on the dial in Fig. 4, are shown in Figures 7 and 9.

In Fig. 7, dial support sleeve 67 rotates with the dial upon boss 68, of the body 26. At the base of the boss a concentric recess 69 is provided to receive one end of the sleeve 67, which has an outwardly turned flange, a section of said flange extending farther out to form a rotating stop 70, (as shown in Fig. 9) of a certain width. Engaging this rotating stop 70 is a fixed stop 71, formed by a turned up lug in retaining plate 72, which plate serves to hold sleeve 67 in place in recess 69, and also to hold springs 73, and packing 74 (Fig. 6) in place, around the ajusting screws 61 and 63. Plate 72 is secured to the body 26 by four screws 75.

Referring to Fig. 9, the number of degrees of arc in the width of rotating stop 70, plus the degrees of arc in the width of fixed stop 71, equals the number of degrees of arc in the smaller angle between "Elec. off" and "Electric broil" on the dial 19, Fig. 4.

When the dial 19 is turned to the position of Figs. 9 and 10 ("Elec. off"), with the stops 70 and 71 engaging each other, the stem 34 will have been turned backwardly on the threads of the post 33 far enough to permit movement of the lever 35 under the pressure of the spring 36b far enough to move the switch 14 to open position, and the valve 36 will be thereby closed. Likewise, the valve 37 will be closed by its spring 37a.

Upon turning of the dial 19 in a clockwise direction until the 350° mark, for example, thereon is at the pointer on the switch button 25, the stem 34 will be screwed on to the post 33 such further distance that the spring 32 which is stronger than the spring 36b will be compressed slightly through abutment of the head of the stem 34 with the lever 35 and thereby effect opening of the valves 36 and 37 against the pressures of their springs and to also release the switch-operating pin 39. The automatic gas control will then be effective, and the switch 14 can be manually closed, if desired. The automatic control by the thermal element 17 will then be effective in its operation against the bellows 31 to effect operation of the valves 36 and 37 and thereby regulate the gas flow to maintain the oven temperature at 350°. At various other temperature settings, there will be regulation of fuel supply in like manner.

When it is desired to use only the electric heater 11, as for broiling, the dial will be turned clockwise until its stop shoulder 70 engages the opposite side of the stationary lug or stop 71 at which time the point "Electric broil" will be in registry with the pointer on the push button 25. The gas valve 20 will be moved to its "off" (closed) position. At this time, the stem 34 is pushed so far inwardly on the post 33 that the lever 35 is held far enough from the switch-operating plunger 39 to permit closing of the switch by the push button. After a broiling operation is completed, the switch can be returned to its open position by turning the dial to the position shown in Figs. 9 and 10 (Elec. off) thus retracting the stem 34 far enough to permit the switch to be opened by the lever 35 through the action of the spring 36b.

In Figures 21, 22, and 23 are shown front, side section, and rear views of a thermostat of simple and cheap design, with no provision for snap-action by-pass control for low temperatures.

Provisions however, are made for the addition of an electric switch, as above described, to be operated by the lever 76. The base plate 41 of the switch would be secured to the body of the thermostat by screws such as the screws 43 of Fig. 5, inserted in tapped holes 77, Fig. 21. The reduced end of the boss 42 would be peened over the reduced end portion of the bracket 44 as at 44a.

The same dial, rotatable sleeve 67, adjusting stem 34, retaining plate 72, etc., would be used.

Instead of a bellows 31, shown in Fig. 7 a diaphragm 78 is used. A single steel stamped plate 79 is used to support said diaphragm, and to serve as a cover over the entire rear of the valve. At the upper end of the plate a threaded outlet connection 28, similar to that shown in Figures 5, 7, and 10 is secured.

The body portion is designed for a die casting, the main gas way 80 being of the diameter corresponding to the tap drill for standard three eighth pipe. Its lower end is threaded at 81, to provide an inlet connection. The lever 76 is pivoted on knife edges, held in bearing points 82 (Fig. 23) by a small spring 83.

A diaphragm of the type shown has little or no fluid in it. The bulb and capillary tube of course contain the usual charge of fluid, but, when charged, the walls of the diaphragm are collapsed, and in contact with each other, or nearly so. Of course as the diaphragm is distended by expansion of the fluid due to rising temperatures of the bulb, some fluid enters the diaphragm, but at most it will contain only a fraction of the amount of fluid held by a bellows, of the type shown in Fig. 7.

Therefore, the diaphragm is not itself subject to the expanding effects of local heat surrounding the thermostat, to the extent to which a bellows is so affected. Consequently, when the diaphragm is subjected to only 200° or 250 degrees local temperature the error in the action of the control is not sufficient to require a bi-metal compensating lever element, as is required when a bellows is used, so the lever 76, Fig. 22, may be made all in one piece, of ordinary steel.

I have discovered, however, that when gas is pre-heated before being passed to an oven burner, that it actually reduces the heating effect. For instance, if a given flow of gas maintains an oven at 400 degrees, when passing to the oven at room temperature, is suddenly heated by heating the gas supply pipes to 300 degrees, it will cause a drop in oven temperature of about 20 degrees. This is undoubtedly due to an expansion and consequent lowering of the B. t. u. content, per cubic foot, of the gas.

Therefore, if the gas supply to the thermostat is taken from a manifold extending through under the cooking top of a range, and is heated by the operation of adjacent top burners, it will increase the error in the control of the thermostat by approximately 15 or 20 degrees.

Because of this, in the use of a thermostat not provided with compensation, it is advisable to take its gas supply from a point other than the manifold under the cooking top, or in other words where it will not be heated by adjacent burners in passing to the oven burner.

Any slight error in control caused directly by the radiation or conduction of heat from the oven walls to the body of the control and the diaphragm within it, may if desired, be corrected by placing the temperature markings on the dial in such a manner as to compensate for such ambient temperatures, which of course will vary more or less uniformly in relation to the temperature of the oven.

A cheaply manufactured control of this character is intended primarily for low-cost ranges having the improved electric-gas oven features above described, such for instance as the design shown in Figure 3.

Further reduction in costs in manufacturing such a range are now made possible by the use of a gas burner of forty per cent smaller capacity than standard, smaller diameter gas supply tubing, fittings, etc. These savings in cost, although they may appear small to a layman, are important where the field is competitive, and often decide the success or failure of the marketing of the product. Furthermore, the saving accomplished by the elimination of the gas broiler compartment, broiler racks, etc., in addition to those mentioned above, have been found to balance the extra cost of the electric broiler and pre-heat unit, and of the wiring, and thermostat switch, thus providing a superior system of oven heating and control at a cost no greater than present designs.

It should be understood of course, that with the cheaper type of control and smaller burner, as above described, the oven, with the aid of the electric unit, will require ten minutes instead of six minutes to be heated to a temperature of 450 degrees, and that it will be possible to control temperatures down only as low as 210°, instead of say 150°. This minimum temperature is below the boiling point of water and thus permits the safe use of the oven for cold-pack canning.

In view of the fact that present gas ovens also require ten minutes to heat to 450°, cannot be regulated lower than 320°, and have no satisfactory method of broiling, the advantages of even the above described cheaper control arrangement is obvious.

In conclusion, I might add that it is not essential to the present invention that an electrically heated resistance be used as a booster heater. Instead, an electrical induction heating device may be substituted, or a flat coil of tubing charged with a highly heated liquid, circulated from a point external of the oven. Such devices are, of course, at present, in more or less of an experimental stage, but they offer alternate means of radiating energy to develop added heat in the oven above that produced by combustion, without adding to the volume of the products of combustion in the oven.

Having described in complete detail the fundamental principle of my invention, and its application, I claim:

1. A control unit comprising a casing having a gas passageway therethrough, a valve for controlling flow of gas through the passageway to a burner, a spring normally urging the valve to its closed position, a member movable to open the valve, a thermally-responsive device for moving the said member to open the valve in opposition to said spring, when the temperature of said device falls below a predetermined range, a member manually operable from exteriorly of the casing, for adjusting the thermally-responsive device to a point at which it will be operative to move the valve-operating member at temperature changes within a given range and further operable to open the valve independently of the thermally-responsive device, an electric switch for controlling an electrical heating element, a member operable from exteriorly of the casing and extending into the casing, for closing the switch, means for holding the switch in closed position, the said switch-closing member when the switch is closed, being in position to be moved in a switch-opening direction through movement of the valve toward its closed position, when the valve is released by the said adjusting member.

2. A control unit comprising a casing having a gas passageway therethrough, a valve for controlling flow of gas through the passageway to a burner, a spring normally urging the valve to its closed position, a member movable to open the valve, a thermally-responsive device for moving the said member to open the valve in opposition to said spring, when the temperature of said device falls below a predetermined range, an adjusting member manually operable from exteriorly of the casing, for adjusting the thermally-responsive device to a point at which it will be operative to move the valve-operating member at temperature changes within a given range and further operable to a stop position at which it will open the valve independently of the thermally-responsive device, an electric switch for controlling an electrical heating element, a member operable in one direction from exteriorly of the casing, for closing the switch, means for holding the switch in its open and closed positions, the said switch-closing member when the switch is closed, being in position to be moved in a switch-opening direction through movement of the valve toward its closed position when the valve is released by the said adjusting member through movement of said member from said stop position to an opposite limit of movement.

3. A control unit comprising a casing having a gas passageway therethrough, a valve for controlling flow of gas through the passageway to a burner, a spring normally urging the valve to its closed position, a member movable to open the valve, a thermally-responsive device for moving the said member to open the valve in opposition to said spring, when the temperature of said device falls below a predetermined range, a dial knob on the casing operatively connected to the thermally-responsive device, for adjusting said device to a point at which it will be operative to move the valve-operating member at temperature changes within a given range, stop members limiting rotative movement of the dial knob, in either direction, means operated by the knob, for positively holding the valve in open position, at one limit of knob movement, an electric switch for controlling an electrical heating element, a member operable in one direction from exteriorly of the casing, for closing the switch, means for yieldably holding the switch in its open and closed positions, the switch closing member being in position, when the switch is closed, to be moved in a switch-opening direction by the valve-operating member through release of this member upon movement of the knob from its said limit of movement in one direction to its limit of movement in the opposite direction.

4. A control unit comprising a casing having a gas passageway therethrough, a valve for controlling flow of gas through the passageway to a burner, a spring normally urging the valve to its closed position, a member movable to open the valve, a thermally-responsive device for moving the said member to open the valve in opposition to said spring, when the temperature of said device falls below a predetermined range, a dial knob on the casing operatively connected to the thermally-responsive device, for adjusting said device to a point at which it will be operative to move the valve-operating member at temperature changes within a given range, stop members limiting rotative movement of the dial knob, in either direction, means operated by the knob, for positively holding the valve in open position, at one limit of knob movement, an electric switch for controlling an electrical heating element, a member operable in one direction from exteriorly of the casing, for closing the switch, means for yieldably holding the switch in its open and closed positions, the switch closing member being in position, when the switch is closed, to be moved in a switch-opening direction, through movement of the valve in a closing direction, upon release of the switch-operating member, when the knob is moved from its said limit of movement in one direction to its limit of movement in the opposite direction, the thermally-responsive device being rendered operative to control the valve, when the knob is adjusted to positions between its said limits of movement.

ROBERT E. NEWELL.

REFERENCES CITED

The following references are of record in the file of this patent:

UNITED STATES PATENTS

| Number | Name | Date |
|---|---|---|
| 2,121,977 | Newell | June 28, 1938 |
| 2,276,930 | Clark | Mar. 17, 1942 |
| 2,282,489 | Madlem | May 12, 1942 |
| 2,310,543 | Pearce | Feb. 9, 1943 |
| 2,350,293 | Stanchfield | May 30, 1944 |